United States Patent [19]

Murphy

[11] Patent Number: 5,699,189
[45] Date of Patent: Dec. 16, 1997

[54] SINGLE LAYER ANTI REFELCTIVE FILLM FOR OPTICAL-SUBSTRATES

[76] Inventor: John P. Murphy, 37508 Grove Ave., Willoughby, Ohio 44094

[21] Appl. No.: 764,166

[22] Filed: Dec. 13, 1996

Related U.S. Application Data

[63] Continuation of Ser. No. 362,850, Dec. 22, 1994, abandoned.

[51] Int. Cl.$^6$ .................... G02B 1/10; B05D 5/06
[52] U.S. Cl. .................... 359/601; 359/581; 427/168; 427/169
[58] Field of Search .................... 359/580, 581, 359/582, 586, 396, 601, 665, 832; 427/164, 168, 169, 498, 512, 165, 163.1, 421, 443.2; 351/44

[56] References Cited

U.S. PATENT DOCUMENTS

| | | | |
|---|---|---|---|
| 3,516,720 | 6/1970 | Mauer | 351/44 X |
| 3,912,378 | 10/1975 | Goto | 359/659 |
| 4,047,804 | 9/1977 | Stephens | 359/586 |
| 4,070,097 | 1/1978 | Gelber | 351/44 X |
| 4,429,956 | 2/1984 | Herbert | 359/647 |
| 4,446,171 | 5/1984 | Thomas | 427/169 |
| 4,575,399 | 3/1986 | Tanaka et al. | 156/272.8 |
| 4,604,297 | 8/1986 | Liu | 427/64 |
| 4,611,892 | 9/1986 | Kawashima et al. | 351/159 |
| 4,734,295 | 3/1988 | Liu | 427/64 |
| 4,765,729 | 8/1988 | Taniguchi | 359/580 |
| 4,783,361 | 11/1988 | Ovshinsky et al. | 351/44 X |
| 4,852,974 | 8/1989 | Melzig et al. | 350/165 |
| 4,877,675 | 10/1989 | Falicoff et al. | 359/288 |
| 4,927,239 | 5/1990 | Melzig et al. | 350/165 |
| 4,966,812 | 10/1990 | Ashley et al. | 427/161 |
| 5,006,409 | 4/1991 | Baiocchi et al. | 351/44 X |
| 5,011,582 | 4/1991 | Oshikawa et al. | 359/900 |
| 5,049,414 | 9/1991 | Kato | 427/169 |
| 5,085,888 | 2/1992 | Moritmoto et al. | 427/108 |
| 5,104,692 | 4/1992 | Belmares | 427/164 |
| 5,116,644 | 5/1992 | Asai et al. | 427/164 |
| 5,153,031 | 10/1992 | Burlitch | 427/226 |
| 5,157,547 | 10/1992 | Paesold | 359/581 |
| 5,173,368 | 12/1992 | Belmares | 359/581 X |
| 5,181,141 | 1/1993 | Sato et al. | 359/581 X |
| 5,181,142 | 1/1993 | Asai et al. | 359/581 |
| 5,225,244 | 7/1993 | Aharoni et al. | 427/240 |
| 5,292,784 | 3/1994 | McKinney et al. | 427/165 |
| 5,345,337 | 9/1994 | Sigler | 359/665 |
| 5,394,269 | 2/1995 | Takamatsu et al. | 359/601 |
| 5,476,717 | 12/1995 | Floch | 428/421 |
| 5,580,819 | 12/1996 | Li et al. | 427/167 |
| 5,585,186 | 12/1996 | Scholz et al. | 428/412 |

FOREIGN PATENT DOCUMENTS 07-294706  12/1995  Japan .................... G02B 1/11

OTHER PUBLICATIONS

Jenkins et al., *Fundamentals of Optics*, McGraw-Hill Book Company, Inc., pp. 146–147, 1957.

Poly(vinyl alchohol) Properties, Encyclopedia of Polymer Science and Engineering, vol. 17, pp. 757–758, 1989.

*Primary Examiner*—Timothy P. Callahan
*Assistant Examiner*—Terry L. Englund
*Attorney, Agent, or Firm*—Rankin, Hill, Lewis & Clark

[57] ABSTRACT

Very thin films of liquid anti-reflection materials are applied to optical substrates to increase effectively visual clarity and visual acuity by reducing reflection light losses, reducing internal reflections and increasing light transmission. The primary properties of the materials which are useful as anti-reflection films are characterized as non-volatile, optically clear liquids having a refractive index less than the refractive index of the optical substrate to which they are applied. Low cost, effective anti-reflection coatings are thus applied to optical substrates, such as eyeglasses, using a single liquid layer of the anti-reflective material.

19 Claims, No Drawings

SINGLE LAYER ANTI REFELCTIVE FILLM FOR OPTICAL-SUBSTRATES

This application is a continuation of application Ser. No. 08/362,850, filed Dec. 22, 1994, now abandoned.

BACKGROUND OFT HE INVENTION

1. Field of the Invention

This invention relates to optical lenses, and more specifically to films applied to eyeglasses to improve the vision through the eyeglasses.

2. Description of the Prior Art

Eyeglasses, like all transparent optical media, have light reflective and refractive qualities which are described by the property called the refractive index or the index of refraction. The materials which are used for optical lenses such as eyeglasses have refractive indices ranging from about 1.50 to 1.80. Higher and lower refractive indices for optical materials are also possible. Materials with a high refractive index reflect more incident light than those with a lower refractive index and refract transmitted light more than those with a lower refractive index. The reflection of light incident on eyeglasses can lead to the loss of some of the incident light because the light which is reflected (externally for instance from the front surface of the lens) is then not transmitted to the eye to form an image. This refection of light can also lead to ghost images or glare when the light which is transmitted into the lens is reflected within the lens and then transmitted to the eye as light which does not form the primary optical image. Such light which is reflected internally within the lens and which then is transmitted to the eye or other sensing medium is sometimes referred to as flare.

These problems are present in many forms of optical lenses, but they are especially difficult to alleviate in eyeglasses. The presence of ghost images, flare or glare in eyeglasses results in visual discomfort and fatigue or irritation to the eyeglass wearer as well as loss of visual acuity. In addition, many special precautions which can be taken in using other optical lenses cannot be used with eyeglasses, since eyeglasses are used in an extremely wide variety of optical conditions and are constantly subject to harsh environmental conditions such as dust and dirt and changes in temperature.

Some of the visual problems associated with the use of high refractive index optical lenses have been moderated by the application of anti-reflection coatings to the lenses. In general these anti-reflection coatings are formed, for example, frequently of three or more carefully applied layers of solid materials of controlled thickness and controlled refractive indices using costly and sophisticated processes for their application to the lenses. These techniques are sometimes applied to eyeglasses, and the solid anti-reflection coatings are applied most often to eyeglasses with high optical correction which, because of their high refractive index, are subject to serious light loss due to reflections and are subject to troublesome perceived glare and discomfort without anti-reflection coating. Many of these techniques and other similar coating techniques are not, however, commonly used with eyeglasses. Such anti-reflection coatings are inherently costly and, therefore, when they are used with eyeglasses, they are used primarily for a limited proportion of eyeglasses, such as those with a high refractive index. In addition to being expensive, these techniques produce a permanent coating on the eyeglass lenses which must be carefully maintained. Since eyeglasses are constantly subject to abuse due to their continual use by the wearer in a wide variety of harsh environments, the coatings can become damaged over time and lose their effectiveness.

Thus the prior art coating techniques suffer from being expensive and difficult to apply and from being permanent so that they are difficult to repair or to re-apply, and there is a need for a simpler coating technique which can be used by the eyeglass wearer and which can be periodically applied to the eyeglasses to optically improve the light reflective and refractive properties of the eyeglasses.

SUMMARY OF THE INVENTION

The present invention overcomes the problems of the prior art and provides other advantages that have not been realized heretofore. The present invention provides an eyeglass coating and a method of application which is simpler than the costly and sophisticated coatings of the prior art. The coating of the present invention is not permanent, so that it can be removed and re-applied by the eyeglass wearer whenever desirable. Since eyeglasses are used in a variety of situations including harsh environments, there is no problem of damaging the eyeglass coating of this invention, since a new coating can be easily and quickly applied to the eyeglasses at any time by the wearer.

The coating materials of this invention are specially selected to be easy to apply and yet provide the anti-reflective properties of the more expensive and more difficult to apply materials of the prior art. Using the application technique of this invention, the coating can be easily, quickly and effectively applied by the wearer at any time whenever the coating is needed.

In accordance with the present invention, very thin films of liquid anti-reflection materials are applied to eyeglasses to increase effectively visual clarity and visual acuity by reducing reflection light losses, reducing internal reflections and increasing light transmission. The primary properties of the materials of this invention which are useful as anti-reflection films are characterized as non-volatile, optically clear liquids having a refractive index less than the refractive index of the optical substrate to which they are applied. A wide variety of materials and a wide variety of combinations of materials can be used to form effective anti-reflection liquid films or coatings on optical surfaces.

The present invention provides materials and means to apply low cost, effective anti-reflection coatings to eyeglasses and other optical surfaces. The invention also provides an improvement in the visual acuity and comfort for wearers of conventional eyeglasses.

These and other advantages are provided by the present invention of a coating applied as a single layer to a surface of an optical substrate, the coating consisting of a non-volatile transparent liquid that forms a continuous film to continuously cover the surface of the optical substrate.

The present invention also provides a method for applying a single layer composition to an optical substrate to form an anti-reflective thin film of the composition consisting of the steps of dissolving the composition in a volatile solvent to form a solution, coating the substrate with the solution, and allowing the volatile solvent to evaporate, leaving a film of the anti-reflective liquid composition on the surface of the optical substrate.

DETAILED DESCRIPTION OF THE PREFERRED EMBODIMENT

As explained above, all transparent optical media have light reflective and refractive qualities described by the property called the refractive index or the index of refraction. The materials used for eyeglass lenses typically have refractive indices of about 1.50 to 1.80, although higher and lower values are possible. The materials which have a high refractive index reflect more incident light than those with a lower refractive index, and the materials which have a high refractive index refract transmitted light more than those with a lower refractive index. Light which is transmitted through eyeglasses to the wearer's eyes is transmitted across two surfaces each of which is subject to reflection and refraction. The first surface is the front surface of the eyeglass lens through which incident light enters the transparent material of the lens. The second surface is the back surface of the eyeglass lens through which the light that has already been transmitted into the lens leaves the lens and proceeds toward the wearer's eye. When light is reflected at either of these two surfaces, less light is transmitted through the surface. The reflection of light incident on each of these surfaces is undesirable because the transmittance of the light is reduced, that is, the light which has been reflected is not available to be transmitted to the eye to form an image. This reflection of light on the back surface of the lens can also lead to flare or ghost images or glare when the light which has been transmitted into the lens is reflected within the lens and then transmitted to the eye as light which does not form the primary optical image.

The properties of reflectance and transmittance can be expressed mathematically. Considering light incident normal to an optical surface, the reflectance R of this light is described by the equation $$R = \left( \frac{n_2 - n_1}{n_1 + n_2} \right)^2 \quad (1)$$

where R is the reflectance or fraction of incident light reflected, and n is the refractive index or index of refraction of a dielectric optical material. Examples of n for use in equation (1) are $n_1=1.0003$ for air having $n=1.0003$ and $n_2=1.523$ for regular optical glass as used for eyeglasses having $n=1.523$.

The transmittance of the light is expressed using the equation is $$T = 1 - R \quad (2)$$

where T is the transmittance or fraction of incident light transmitted.

It is possible with the use of the equations (1) and (2) to calculate the total reflectance or total transmittance of an eyeglass lens for normal incident light striking the front and back surfaces of eyeglass lenses. It is also possible using these equations to make similar calculations for normal incident light striking lenses having optical coatings. Applying the equations to a simple eyeglass lens, there are only two surfaces, the front and the back surfaces of the lens. (If optical coatings were applied to the lenses, there would be more than two optical surfaces for which calculations must be made.)

Applying the equations above for incident light normal to regular eyeglasses lenses having $n=1.523$, and considering both the front and the back surfaces of the lenses, results in a total reflectance value of $R_{TOTAL}=0.084$ and a total transmittance value of $T_{TOTAL}=0.916$. This means that 8.4% of the original incident light is lost before it reaches the eye and thus 91.6% of the original incident light is transmitted to the eye as the light passes through the front and back surfaces of the eyeglasses. These total reflectance and transmittance values are typical for regular optical glass eyeglasses that normally do not have anti-reflection coatings applied.

Applying the equations above to optical materials which are typically used for eyeglasses leads to the calculated total reflectance and calculated total transmittance values in Table I for the eyeglass lens materials noted compared to original normal incident light. For each lens material, the equations are applied considering both the front and back surfaces of the lens. The "Total Light Reflected" and "Total Light Transmitted" values in Table 1 are the calculated $R_{TOTAL}$ and $T_{TOTAL}$, respectively, multiplied times 100 to express the value as a percentage.

TABLE I

Calculated Total Normal Incident Light Reflected or Transmitted

| Lens Material | Refractive Index n | Total Light Reflected (% Reflected) | Total Light Transmitted (% Transmitted) |
|---|---|---|---|
| CR-39 Plastic | 1.5002 | 7.8 | 92.17 |
| Glass I | 1.523 | 8.40 | 91.60 |
| Polycarbonate | 1.590 | 10.11 | 89.89 |
| Glass II | 1.70 | 12.98 | 87.02 |
| Glass III | 1.80 | 15.65 | 84.35 |

Many factors affect visual acuity, especially when wearing eyeglasses. Among these are the level of illumination, the light intensity of the visual image, the contrast of the components of the visual image, and the presence or absence of secondary images or interfering light or glare. Relatively small changes in these factors can affect visual acuity and comfort or discomfort. An improvement in any of the factors can have a noticeable effect in the visual clarity of the perceived image.

In accordance with this invention, it has been found that applying very thin films of liquid anti-reflection materials to eyeglasses effectively increases visual clarity and visual acuity when using such treated eyeglasses. The present invention involves the application of anti-reflection liquid films or coatings to optical surfaces to reduce reflection light losses, to reduce internal reflections and to increase light transmission. The primary properties of the materials of this invention which are useful as anti-reflection films are characterized as non-volatile, optically clear liquids having a refractive index less than the refractive index of the optical substrate to which they are applied. The general and specific natures of effective materials are described further below. It will become clear that a very wide variety of materials and a very wide variety of combinations of materials can be used to form effective anti-reflection liquid films or coatings on optical surfaces.

One important property of liquids for use as coatings in this invention is that the applied liquid wets the optical surface. Many liquids of appropriate refractive index and low volatility may not wet optical surfaces adequately to allow their application alone as thin films. Combining non-wetting liquids with a wetting agent can result in liquids with desirable refractive index, low volatility, good optical surface wetting and good film forming characteristics. In order to be effective, the liquid should form a full layer completely across the entire surface of the lens substrate on which it is applied. The liquid should cover the surface to form a layer of generally uniform thickness, without forming beads or streaks which would interfere with the clarity of the lens.

The equation (1) above for calculating reflectance R can be used to calculate the reflectance of a liquid film in contact with air and to calculate the reflectance of a liquid film in contact with the lens. For a simple lens coated on each side with a liquid film there are four optical interface surfaces. These four surfaces are (1) the front air-liquid surface, (2) the front liquid-lens surface, (3) the back leto-liquid surface and (4) the back liquid-air surface. The total reflectance and total transmittance values for normal incident light striking the lens materials of Table I with and without liquid anti-reflection films or coatings on their front and back surfaces have been calculated for films of several refractive indices and are given in Table II. In each case, the calculated values consider both the front and back surfaces. Each total reflectance value, %R, in Table II is the percentage of original normal incident light that is reflected, that is, $R_{TOTAL}$ multiplied by 100 to express the value as a percentage. Each total transmission value, %T, in Table II is the percentage of original normal incident light that is transmitted through the lenses and coatings and to the eye in the case of eye-glasses, that is $T_{TOTAL}$ multiplied by 100 to express the value as a percentage, or 100−%R.

Changes or reductions in reflected light are indicative of a change in potential for ghost images or glare resulting from internal lens reflections. The reflected light dam, %R, from Table II are repeated in Table III which also compares the %R value for the uncoated lenses with the %R value for coated lenses for different anti-reflection films having the various refractive indices n, and provides a calculation of the percentage reduction in reflected light due to the application of each anti-reflection film represented by one of the refractive indices. As in Table II, the calculated values consider both the front and back surfaces in each case in Table III. Overall the reductions in potential for reflections of normal incident light are quite significant for films with refractive indices as shown in Table II and III. The reductions in reflected light are indicative of a reduction in ghost images or glare resulting from reduced internal lens reflections. A visual effect from the reduction of ghost images or glare is that the primary image will not have as much stray light registered over it, and the primary image will have higher visual contrast.

TABLE II

Calculated Total Normal Incident Light Reflected or Transmitted for Five Lens Materials Without and Coated With Six Liquid Films of Refractive Indices n as Indicated

| Film Material | Lens Material | | | | | | | | | |
|---|---|---|---|---|---|---|---|---|---|---|
| | CR-29 Plastic n = 1.5002 | | Glass I n = 1.523 | | Polycarbonate n = 1.590 | | Glass II n = 1.70 | | Glass III n = 1.80 | |
| | % R* | % T** | % R* | % T** | % R* | % T** | % R* | % T** | % R* | % T** |
| Air | | | | | | | | | | |
| n = 1.0003 | 7.83 | 92.17 | 8.40 | 91.60 | 10.11 | 89.89 | 12.98 | 87.02 | 15.65 | 84.35 |
| n = 1.403 | 5.75 | 94.25 | 5.85 | 94.15 | 6.27 | 93.73 | 7.26 | 92.74 | 8.42 | 91.58 |
| n = 1.420 | 6.07 | 93.93 | 6.15 | 93.85 | 6.52 | 93.48 | 7.43 | 92.57 | 8.53 | 91.47 |
| n = 1.442 | 6.51 | 93.49 | 6.57 | 93.43 | 6.88 | 93.12 | 7.69 | 92.31 | 8.70 | 91.30 |
| n = 1.4585 | 6.86 | 93.14 | 6.91 | 93.09 | 7.17 | 92.83 | 7.91 | 92.09 | 8.86 | 91.14 |
| n = 1.470 | 7.12 | 92.88 | 7.16 | 92.84 | 7.39 | 92.61 | 8.08 | 91.92 | 8.98 | 91.02 |
| n = 1.480 | 7.43 | 92.57 | 7.38 | 92.62 | 7.58 | 92.42 | 8.23 | 91.77 | 9.10 | 90.90 |

*% R is the total reflectance $R_{TOTAL}$ at all surfaces expressed as a percentage of the original normal incident light striking the lens materials.
**% T is the total transmittance $T_{TOTAL}$ at all surfaces expressed as a percentage of the original normal incident light striking the lens material.

TABLE III

Calculated Total Normal Incident Light Reflected and Reduction in Light Reflected for Six Liquid Films Applied to Five Lens Materials

| Film Material | Lens Material | | | | | | | | | |
|---|---|---|---|---|---|---|---|---|---|---|
| | CR-39 Plastic n = 1.5002 | | Glass I n = 1.523 | | Polycarbonate n = 1.590 | | Glass II n = 1.70 | | Glass III n = 1.80 | |
| | %R* | Reduction† | %R* | Reduction† | %R* | Reduction† | %R* | Reduction† | %R* | Reduction† |
| Air n = 1.0003 | 7.83 | | 8.40 | | 10.11 | | 12.98 | | 15.65 | |
| n = 1.403 | 5.75 | 27% | 5.85 | 30% | 6.27 | 38% | 7.26 | 44% | 8.42 | 46% |
| n = 1.420 | 6.07 | 22% | 6.15 | 27% | 6.52 | 36% | 7.43 | 43% | 8.53 | 45% |
| n = 1.442 | 6.51 | 17% | 6.57 | 22% | 6.88 | 32% | 7.69 | 41% | 8.70 | 44% |
| n = 1.4585 | 6.86 | 12% | 6.91 | 18% | 7.17 | 29% | 7.91 | 39% | 8.86 | 43% |
| n = 1.470 | 7.12 | 9% | 7.16 | 15% | 7.39 | 27% | 8.08 | 38% | 8.98 | 43% |
| n = 1.480 | 7.43 | 5% | 7.38 | 12% | 7.58 | 25% | 8.23 | 37% | 9.10 | 42% |

*%R is the total reflectance at all surfaces expressed as a percentage of the original normal incident light striking the lens material.
†"Reduction" is the ratio of %R for the coated lens divided by %R for the uncoated lens material, multiplied by 100 to express the value as a percentage, and subtracted from 100%.

The changes or increases in transmitted light are indicative of a higher intensity image which in the case of a visual image results in easier sensing and a reduction in iris diameter which in turn can result in an increased depth of focus and a more precise, better focussed image. The transmitted light data, %T, from Table II are repeated in Table IV which includes a calculation of the increase in the percentage of transmitted light due to presence of different anti-reflection films represented by their refractive indices, n. As in Table II, the calculated values consider both the front and back surfaces in each case in Table IV. Considering that a change in transmitted light of 1% can be perceived, the increases in potential for transmitted light shown for the films are quite significant.

TABLE IV

Calculated Total Normal Incident Light Transmitted and Increase in Light Transmitted for Six Liquid Films Applied to Five Lens Materials

| Film Material | Lens Material | | | | | | | | | |
|---|---|---|---|---|---|---|---|---|---|---|
| | CR-39 Plastic n = 1.5002 | | Glass I n = 1.523 | | Polycarbonate n = 1.590 | | Glass II n = 1.70 | | Glass III n = 1.80 | |
| | %T** | Increase‡ | %T** | Increase‡ | %T** | Increase‡ | %T** | Increase‡ | %T** | Increase‡ |
| Air n = 1.0003 | 92.17 | | 91.60 | | 89.89 | | 87.02 | | 84.35 | |
| n = 1.403 | 94.25 | 2% | 94.15 | 3% | 93.73 | 4% | 92.74 | 7% | 91.58 | 9% |
| n = 1.420 | 93.93 | 2% | 93.85 | 2% | 93.48 | 4% | 92.57 | 6% | 91.47 | 8% |
| n = 1.442 | 93.49 | 1% | 93.43 | 2% | 93.12 | 4% | 92.31 | 6% | 91.30 | 8% |
| n = 1.4585 | 93.14 | 1% | 93.09 | 2% | 92.83 | 3% | 92.09 | 6% | 91.14 | 8% |
| n = 1.470 | 92.88 | 0.8% | 92.84 | 1% | 92.61 | 3% | 91.92 | 6% | 91.02 | 8% |
| n = 1.480 | 92.57 | 0.4% | 92.62 | 1% | 92.42 | 3% | 91.77 | 5% | 90.90 | 8% |

**%T is the total transmittance at all surfaces expressed as a percentage of the original normal incident light striking the lens material.
‡"Increase" is the ratio of %T for the coated lens divided by %T for the uncoated lens material, multiplied to 100 to express the value as a percentage, and subtracted from 100%.

Very thin liquid films ranging from n=1.40 to n=1.49 have been applied to eyeglasses and in every instance an increase in visual clarity and comfort has been found as a result of applying these liquid films to the eyeglasses. Specific liquids and details for films tested are provided below.

A listing of materials that have been used either alone or in combination to form the liquid films of this invention and their refractive indices, n, is in Table V. Molecular weight for each material is included in the Table V because high molecular weight generally indicates that the material is non-volatile; this is not, however, universally true since as indicated by the presence in the listing of glycerol, which is a low molecular weight non-volatile component. All of the materials in Table V have a molecular weight of at least 100 or a boiling point or flash point of over 148° C. For this reason the term "non-volatile" as used in this disclosure and the claims is defined as a material having a molecular weight of 100 or more or having a boiling point or flashing point of 148° C. or higher.

TABLE V

Components for Liquid Anti-Reflection Films

| Name, (properties, availability) | Molecular Weight | Refractive Index, n (at 24/25° C.) |
|---|---|---|
| 1. Glycerol (1,2,3 propanetriol) boiling point 290° C. | 92.09 | 1.4729 |
| 2. Copolymer of ethylene oxide and propylene oxide, available as Pluronic M4 from BASF, also known as Poloxamer 124 | 2200 | 1.4589 |
| 3. Polyethylene glycol, flash point 249° C., available as Pluracol E600 from BASF | 600 | 1.4670 |
| 4. Octylphenol ethoxylate, boiling point > 350° C., available as Iconol OP-10 from BASF, 10-mole ethylene oxide adduct of octyl phenol. | 650 | 1.4905 |
| 5. Tridecyl alcohol ethoxylate, | 550 | 1.458 |

TABLE V-continued

Components for Liquid Anti-Reflection Films

| Name, (properties, availability) | Molecular Weight | Refractive Index, n (at 24/25° C.) |
|---|---|---|
| boiling point > 425° F., available as Iconol TDA-8 from BASF, 8-mole ethylene oxide adduct of tridecyl alcohol | | |
| 6. Polyvinyl methyl ether, available from BASF as Lutonal M-40 | >1000 | 1.48 |
| 7. Polyvinyl alcohol, available as Product No. 7647 from Monomer-Polymer & Dajac Laboratories, Inc. | >1000 | 1.50 |
| 8. Methyl (propylhydroxide, ethoxylated) bis (trimethylsiloxy) silane, available as Q2-5211 Superwetting Agent from Dow Corning Corporation | >200 | 1.4495 |
| 9. Polydimethylsiloxane polyethylene oxide-propylene oxide copolymer, flashpoint > 100° C., available as product SF1188 from GE Silicones | >800 | 1.4470 |
| 10. Polydimethylsiloxane silicone fluid, available as Product SF96-100 from GE Silicones | 6000 | 1.403 |
| 11. Polyalkyleneoxide modified heptamethyltrisiloxane, available as Silwet L-77 from OSi Specialties, Inc. | 600 | 1.4418 |
| 12. Fluorinated alkyl alkoxylate, boiling point > 148° C., available as FC-171 Brand fluorochemical surfactant from 3M, St. Paul, Minn. | >200 | 1.3983 |
| 13. Fluorocarbon telomer B monoether with polyethylene glycol, available as Zonyl FSN Fluoro-surfactant from DuPont | 950 | 1.42 |
| 14. Ethoxylated tetramethyldecynediol, flashpoint > 110° C., available as Surfynol# 465 Surfactant from Air Products and Chemical, Inc. | >600 | 1.4660 |
| 15. Sodium dioctyl sulfosuccinate combined with 16% propylene glycol, available as Monawet MO-84R2W from Mona Industries, Inc. | >400 | 1.46 |
| 16. Polyoxyalkylated alkyl aryl phosphoric acid ester, sodium salt, nil volatiles, flashpoint > 200° F., available as Chemphos TC-310S from Chemron Corp. | >400 | 1.4855 |
| 17. Polyoxyethylene (20) sorbitan monooleate, flashpoint > 300° F., available as Tween 80 from ICI Americas Inc. | >900 | 1.4712 |

The materials of Table V are very diverse. Their common characteristics are that they are non-volatile and can be used to form very thin, clear films. Other materials, such as high molecular weight hydrocarbons of suitable refractive index and low volatility can also be used. Similarly, various polymers of suitable refractive index can be used. Many of the materials of Table V contain ether functionality.

The test for effectiveness of the liquid films of this invention has been to apply a film with thickness in the range of 10 to 20 nanometers to eyeglasses and then to determine the effect of the films on vision. While a thickness of 10 to 20 nanometers is preferred, the films of the present invention can function with thicknesses as high as 100 nanometers. All of the materials in Table V have been tested in such films and have been found effective for improving visual clarity of the eyeglasses to which they were applied.

Using the method of the present invention, a suitable material is chosen. The materials may be chosen using the listing of Table V with particular attention paid to the wetting properties of the material, its transparency, and its ease of use. The material or combination of materials is dissolved in distilled water. The distilled water solution is then applied to the front and back surfaces of the eyeglasses. The solution may be applied by spraying the solution onto the surfaces in a free mist using a suitable applicator, such as a spray bottle. Alternatively, a cloth can be dipped or soaked in the solution and used to wipe the solution onto the lens surfaces, or the eyeglasses can be dipped into a container of the solution. The front and back surfaces of the eyeglasses should be readily wet completely by the solution. The applied solution is then wiped from the lens surfaces with soft absorbent tissue. A very thin aqueous film of liquid material remains on the surfaces, and this thin film commonly exhibits light interference fringes, which interference fringes disappear as the film of aqueous solution dries. The drying of this aqueous film leaves a very thin, invisible liquid film of the liquid, and this film forms the desired coating surface which reduces reflections. The film can wear away or otherwise be removed after a period of time. Depending upon the use and care of the eyeglasses, the film may last for several days or weeks. When the film has worn away, the user merely reapplies the material in the same manner as before.

The following examples describe the invention but are not limiting with respect to its application.

EXAMPLE 1

Polyethylene glycol, having a molecular weight of 600, and having refractive index of n=1.4670 is available from BASF as Pluracol E600. This clear, colorless, non-volatile liquid polymer does not wet eyeglasses readily. A 10-mole ethylene oxide adduct of octyl phenol of 650 molecular weight has a refractive index of n=1.4905 and is an excellent wetting agent. This octyl phenol ethoxylate is available from BASF as Iconol OP-10. Combining the octyl phenol ethoxylate with the polyethylene glycol results in a clear liquid that wets eyeglasses readily. The solution of 60.6% by weight Pluracol E600 combined with 39.4% by weight Iconol OP-10 is a clear, colorless liquid having a refractive index n=1.4734 at 24° C.

0.165% of this solution was dissolved in distilled water. The distilled water solution was sprayed onto the front and back surfaces of eyeglasses, which were readily wet completely by the solution, and was wiped from the lens surfaces with soft absorbent tissue, leaving a very thin aqueous film of liquid material exhibiting light interference fringes, which interference fringes disappeared as the film of aqueous solution dried. The drying of this aqueous film leaves an invisible liquid film of the liquid comprised of 60.6% polyethylene glycol plus 39.4% octyl phenol ethoxylate having a thickness of 10 nanometers coating the lens surfaces.

When applied to eyeglasses made from CR-39 plastic (n=1.5002), the glasses treated with the film as described above had a visual image with greater clarity, increased contrast and brighter intensity, and had increased visual comfort compared to the untreated eyeglasses.

This same solution was used to coat the eyeglasses of 11 persons without selecting the types of lenses they used. All 11 persons found that visual clarity was increased and 4 volunteered without prompting that the visual image was brighter. Two of the eleven persons finding benefit from the liquid film coating of this example had prior art anti-reflection coatings applied to their eyeglasses during their manufacture. One of these two pairs of glasses with anti-reflection coating used polycarbonate (n=1.590) lenses.

The optical benefits of the liquid film as described above are retained for two weeks or longer.

This same aqueous solution was used to coat, using the method described above, the right half of a freshly cleaned and dried interior surface of a glass window overlooking an exterior scene. The window had been freshly cleaned with 70% by volume isopropyl alcohol in water. The image of the exterior scene through the half of the window coated with the liquid film left after the water evaporated was clearer, had higher contrast and was brighter than the same image through the uncoated half of the glass window.

EXAMPLE 2

Glycerol, of molecular weight 92.09, is a clear, colorless, non-volatile liquid (boiling point 290° C.) that does not wet CR-39 plastic. Glycerol has a refractive index of n=1.4729. Combining glycerol with a 10-mole ethylene oxide adduct of octyl phenol of 650 molecular weight, Iconol OP-10, having a refractive index of n=1.4905 results in a clear, colorless liquid that wets CR-39 plastic and eyeglass lenses readily. The solution of 60.6% by weight glycerol plus 39.4% Iconol OP-10 is a clear colorless liquid having a refractive index of n=1.480.

0.165% of this solution was dissolved in distilled water. The distilled water solution was sprayed onto the front and back surfaces of eyeglasses made from CR-39 plastic (n=1.5002), which were readily wet by the aqueous solution. The aqueous solution was wiped from the lens surfaces with a soft absorbent tissue, leaving a very thin aqueous film of liquid material exhibiting light interference fringes, which interference fringes disappeared as the film of aqueous solution dried, leaving a film of about 10 nanometers thick coating the lens surfaces.

The eyeglasses treated with the film of glycerol plus octyl phenol ethoxylate had a visual image with greater clarity, increased contrast and brighter intensity compared to the untreated eyeglasses.

EXAMPLE 3

Polyalkyleneoxide modified heptamethyltrisiloxane, in the chemical family silicone-polyether copolymer, of 600 molecular weight, having refractive index of n=1.4418 at 24° C. is available from OSI Specialties, Inc. as Silwet L-77. This clear, amber liquid wets eyeglasses readily.

0.25% by weight of Sitwet L-77 was dissolved in distilled water. The distilled water solution was sprayed onto the front and back surfaces of eyeglasses made from CR-39 plastic (n=1.5002), which were readily wet by the aqueous solution. The aqueous solution was wiped from the lens surfaces with soft absorbent tissue, leaving a very thin aqueous film of liquid material exhibiting light interference fringes, which interference fringes disappeared as the film of aqueous solution dried. The drying of this aqueous film left an invisible liquid film of Silwet L-77 about 15 nanometers thick coating the lens surfaces.

The eyeglasses treated with the film of Silwet L-77 as described above had a visual image with greater clarity, increased contrast and brighter intensity compared to the untreated eyeglasses.

This aqueous solution of Silwet L-77 was used to coat, using the method described above, the left half of a freshly cleaned, with 70% by volume isopropyl alcohol in water, and dried interior surface of a glass window overlooking an exterior scene. The image of the exterior scene through the half of the window coated with the liquid film of Silwet L-77 left after the water evaporated was clearer, had higher contrast and was brighter than the same image through the uncoated half of the glass window.

EXAMPLE 4

Polyvinyl alcohol, Product No. 7647 from Monomer-Polymer & Dajac Laboratories, Inc. is a 4200 molecular weight water soluble polymer prepared by hydrolyzing polyvinyl acetate to form a polymer with 90% alcohol side groups and 10% acetate side groups. The determined refractive index for a 25% by weight solution of polyvinyl alcohol Product No. 7647 in distilled water is n=1.3748 at 24° C. An estimate for the refractive index for the neat polymer is n=1.50 based on the refractive index of the 25% solution of this polymer in water. A dilute solution of polyvinyl alcohol product No. 7647 in water does not wet eyeglasses. A dilute aqueous solution of polyvinyl alcohol Product No. 7647 plus the wetting agent Iconol OP-10 (10-mole ethylene oxide adduct of octyl phenol of 650 molecular weight having refractive index n=1.4905) wets eyeglasses readily.

Polyvinyl alcohol Product No. 7647 and the octylphenol ethoxylate Iconol OP-10 were combined in a ratio of 75.5 parts by weight polyvinyl alcohol Product No. 7647 to 24.5 parts by weight Iconol OP-10 as a distilled water solution containing 0.265% by weight of these ingredients. This 0.265% solution of polyvinyl alcohol plus octylphenol ethoxylate was sprayed onto the front and back surfaces of eyeglasses made from CR-39 plastic (n=1.5002) which were wet readily by the solution. The aqueous solution was wiped from the lens surfaces with soft absorbent tissue and allowed to dry as in the earlier examples to leave a film about 16 nanometers thick with refractive index n≈1.498 on the lens surfaces.

The eyeglasses treated with the film of polyvinyl alcohol plus octylphenol ethoxylate as described above had a visual image with greater clarity, increased contrast and brighter intensity compared to the untreated eyeglasses.

EXAMPLE 5

A fluorosurfactant is available from DuPont as Zonyl FSN, fluorocarbon telomer B monoether with polyethylene glycol having ca 950 molecular weight and refractive index n≈1.42. The fluorocarbon telomer B monoether Zonyl FSN is available as a 40% by weight solution combined with 30% isopropyl alcohol plus 30% water. The refractive index of this 40% solution is n=1.3806 at 24° C. for this amber, clear solution. Based on this determined refractive index for the 40% solution, the refractive index for the neat fluorocarbon telomer B monoether is estimated to be n≈1.42.

Zonyl FSN is soluble in water. A solution in distilled water of 0.165% fluorocarbon telomer B monoether with polyethylene glycol (0.4125% of the Zonyl FSN solution containing 40% fluorocarbon telomer B monoether) was sprayed onto the front and back surfaces of eyeglasses made from CR-39 plastic (n=1.5002) which were wet readily by the solution. The aqueous solution was wiped from the lens surfaces with soft absorbent tissue and allowed to dry as in the earlier examples to leave a film about 10 nanometers thick with refractive index n≈1.42.

The eyeglasses treated with the film of fluorocarbon telomer B monoether with polyethylene glycol as described above had a visual image with greater clarity, increased contrast and brighter intensity compared to the untreated eyeglasses.

EXAMPLE 6

Chemphos TC-310S is a sodium salt of a polyoxyalkylated alkyl aryl phosphoric acid ester with a greater than 400 molecular weight available from Chemron Corporation. Chemphos TC-310S is a clear, colorless, viscous liquid containing 99% active material and has refractive index n=1.4855 at 24° C. Chemphos TC-310S is soluble in water and is an excellent wetting agent.

0.25% by weight Chemphos TC-310S was dissolved in distilled water. The distilled water solution was sprayed onto the front and back surfaces of eyeglasses made from CR-39 plastic (n=1.5002), which were readily wet by the aqueous solution. The aqueous solution was wiped from the lens surfaces with soft absorbent tissue and allowed to dry as in the earlier examples to leave a film about 15 nanometers thick with refractive index n=1.4855 on the lens surfaces.

The eyeglasses treated with the film of Chemphos TC-310S as described above had a visual image with greater clarity, increased contrast and brighter intensity compared to the untreated eyeglasses.

Many variations on the materials suitable for use on this invention are possible. Many variations on methods for applying the very thin films of this invention, compared to the examples given, are possible. While the examples have dealt with the use of aqueous dilute solutions, other volatile solvents for film formers of appropriate refractive index, for instance alcohols, hydrocarbons, esters, ketones and the like may be used to apply materials that are not soluble or readily dispersible in water. Vapor deposition can also be used to apply the very thin films of this invention.

An advantage for the method of using dilute solutions of the film formers of this invention is that wearers of eyeglasses can apply the anti-reflection films of this invention themselves. A further value of this method is that the anti-reflection film formers of this invention can be incorporated into a cleaning solution that allows wearers of eyeglasses to simultaneously cleanse soiled eyeglasses and re-apply a fresh anti-reflection film at the same time.

While the invention has been described with specific application to eyeglasses and while the invention has many advantages when applied to eyeglasses, it should be understood that many of the advantages of the present invention can be utilized when applied to other optical substrates, such as windows and video screens. Therefore, the invention is not limited to application to eyeglasses alone.

Other variations and modifications of the specific embodiments herein shown and described will be apparent to those skilled in the art, all within the intended spirit and scope of the invention. While the invention has been shown and described with respect to particular embodiments thereof, these are for the purpose of illustration rather than limitation. Accordingly, the patent is not to be limited in scope and effect to the specific embodiments herein shown and described nor in any other way that is is inconsistent with the extent to which the progress in the art has been advanced by the invention.

What is claimed is:

1. In combination with a surface of an optical substrate an anti-reflective coating applied as a single layer to the surface of the optical substrate, the coating consisting of a non-volatile transparent liquid that flows along the surface of the optical substrate to form a continuous liquid film and which entirely covers the surface of the optical substrate, the liquid film remaining as a liquid on the substrate, wherein the film provides an anti-reflective interface between the substrate and air.

2. The combination in accordance with claim 1, wherein the anti-reflective transparent liquid has a refractive index less than that of the optical substrate.

3. The combination in accordance with claim 1, wherein the anti-reflective non-volatile transparent liquid has a refractive index less than 1.80.

4. The combination in accordance with claim 1, wherein the non-volatile transparent liquid contains ether functionality.

5. The combination in accordance with claim 1, wherein the continuous film on the optical substrate has a film thickness of 100 nanometers or less.

6. The combination in accordance with claim 1, wherein the liquid has wetting properties to form the continuous film to continuously cover the surface of the optical substrate.

7. In combination with a surface of an optical substrate, an anti-reflective coating applied as a single layer to the surface of the optical substrate, the coating consisting of a non-volatile transparent liquid that flows along the surface of the optical substrate and which has a refractive index less than that of the optical substrate, the coating forming a continuous liquid film with a thickness of 100 nanometers or less entirely covering the surface of the optical substrate, the film remaining as a liquid without evaporating, solidifying or curing, wherein the film provides an anti-reflective interface between substrate and air.

8. A method for applying a single layer composition to a surface of an optical substrate to form an anti-reflective thin film of the composition consisting of the steps of dissolving the composition in a volatile solvent to form a solution, coating the surface of the substrate with the solution, and allowing the volatile solvent to evaporate, leaving the film of anti-reflective composition on the surface of the optical substrate without heating or curing, wherein the film provides an anti-reflective interface between the substrate and air.

9. The method in accordance with claim 8, wherein the substrate is coated with the solution over an entire surface thereof to form a continuous layer.

10. The method in accordance with claim 8, wherein the substrate is coated with the solution by spraying the solution onto the substrate.

11. The method in accordance with claim 8, wherein the substrate is coated with the solution by wiping the solution onto the substrate.

12. The method in accordance with claim 8, wherein the substrate is coated with the solution by dipping the substrate into a container of the solution.

13. The method in accordance with claim 8, wherein excess material is wiped from the substrate before allowing the solvent to evaporate.

14. A method for applying a single layer composition to a surface of an optical substrate to form an anti-reflective thin film of the composition consisting of the steps of dissolving the composition in a volatile solvent to form a solution, spraying the solution onto the entire surface of the substrate to form, a continuous layer, wiping excess solution film the surface of the substrate, and allowing the volatile solvent to evaporate, leaving a liquid film of anti-reflective liquid composition on the surface of the optical substrate without allowing the film to solidify or cure, wherein the film provides an anti-reflective interface between the substrate and air.

15. In combination with a surface of an optical substrate, a coating applied to the surface as a single-layer, continuous, transparent, smooth film of an anti-reflective material, the film being applied in the form either of a liquid or of a liquid solution of the material, the material of the film remaining on the surface as a liquid after said application and providing an anti-reflective properties interface between the substrate and air without heating or curing.

16. The combination in accordance with claim 15, wherein the coating has refractive index less than that of the optical substrate.

17. The combination in accordance with claim 15, wherein the coating has a refractive index of less than 1.80.

18. The combination in accordance with claim 15, wherein the coating contains ether functionality.

19. The combination in accordance with claim 15, wherein the continuous film has a thickness of 100 nanometers or less.

* * * * *

UNITED STATES PATENT AND TRADEMARK OFFICE
CERTIFICATE OF CORRECTION

PATENT NO : 5,699,189
DATED : December 16, 1997
INVENTOR(S): John P. Murphy

It is certified that error appears in the above-identified patent and that said Letters Patent is hereby corrected as shown below:

On the title page, item [54] and column 1, line 1:

Column 1, line 7, "OFT HE" should be --OF THE--.
Column 4, line 20, "7.8" should be --7.83--.
Column 5, line 3, "leto-liquid" should be --lens-liquid--.
Column 5, after line 18, in Table II, "CR-29 Plastic" should be --CR-39 Plastic--.
Column 6, line 1, "dam" should be --data--.
Column 8, after line 47, in Table V, item 2, "M4" should be --L44--.
Column 10, line 57, "free" should be --fine--.
Column 12, line 10, "from" should be --front--.
Column 12, line 29, "OSI" should be --OSi--.
Column 12, line 31, "Sitwet" should be --Silwet--.
Column 14, line 42, after "substrate" a comma --,-- should be inserted.
Column 15, line 9, after "between" --the-- should be inserted.
Column 16, line 6, after "form" the comma should be deleted.
Column 16, line 7, "film" should be --from--.
Column 16, line 23, after "has" --a-- should be inserted.

Signed and Sealed this

Twenty-fourth Day of February, 1998

Attest:

BRUCE LEHMAN

*Attesting Officer*     *Commissioner of Patents and Trademarks*